US007892011B2

(12) United States Patent
Beer

(10) Patent No.: US 7,892,011 B2
(45) Date of Patent: Feb. 22, 2011

(54) MULTI-CONNECTOR APPARATUS WITH CONNECTION-SEQUENCING INTERLOCK MECHANISM

(75) Inventor: Robert C. Beer, Noblesville, IN (US)

(73) Assignee: Delphi Technologies, Inc., Troy, MI (US)

( * ) Notice: Subject to any disclaimer, the term of this patent is extended or adjusted under 35 U.S.C. 154(b) by 141 days.

(21) Appl. No.: 12/313,424

(22) Filed: Nov. 20, 2008

(65) Prior Publication Data

US 2010/0124836 A1    May 20, 2010

(51) Int. Cl.
H01R 13/62    (2006.01)
(52) U.S. Cl. .................................... 439/347
(58) Field of Classification Search .............. 439/347, 439/350, 555, 510, 76.1, 540, 352, 372; 174/67
See application file for complete search history.

(56) References Cited

U.S. PATENT DOCUMENTS

| 5,017,147 | A | 5/1991 | Sugiyama et al. | |
| 6,607,394 | B2 | 8/2003 | Lindberg et al. | |
| 6,814,606 | B2 * | 11/2004 | Kobayashi | 439/372 |
| 6,896,528 | B2 * | 5/2005 | Kubota et al. | 439/135 |
| 7,084,361 | B1 | 8/2006 | Bowes et al. | |
| 7,402,068 | B1 | 7/2008 | Tarchinski | |

| 2004/0005804 | A1 | 1/2004 | Kubota et al. |
| 2008/0076290 | A1 | 3/2008 | Buck et al. |

FOREIGN PATENT DOCUMENTS

| DE | 10 2006 044 655 | 2/2008 |
| EP | 1 378 970 | 1/2004 |
| FR | 2 908 932 | 5/2008 |

OTHER PUBLICATIONS

European Search Report dated Feb. 23, 2010.

* cited by examiner

*Primary Examiner*—Alexander Gilman
(74) *Attorney, Agent, or Firm*—Jimmy L. Funke

(57) ABSTRACT

An interlock plate slidably affixed to a multi-bay connector header ensures a preordained connection sequence of multiple plug-in connectors. The interlock plate covers portions of the connector header, and can move with respect to the connector header to prevent access to selected bays of the header. When in a base position, the interlock plate allows insertion of one or more make-first/break-last connector plugs, but blocks insertion of one or more make-last/break-first connector plugs. When in a shifted position, the interlock plate prevents removal of the inserted make-first/break-last connector plug(s), and allows insertion of the make-last/break-first connector plug(s). Insertion of the make-last/break-first connector plug(s) locks the interlock plate in the shifted position, so that the make-last/break-first connector plug(s) must be removed prior to the make-first/break-last connector plug(s).

5 Claims, 5 Drawing Sheets

MULTI-CONNECTOR APPARATUS WITH CONNECTION-SEQUENCING INTERLOCK MECHANISM

TECHNICAL FIELD

The present invention is directed to connection systems including multiple plug-in connectors, and more particularly to an interlock mechanism for ensuring that the plug-in connectors are inserted in a specified sequence and removed in the opposite sequence.

BACKGROUND OF THE INVENTION

In an electrical system including multiple components or modules that are interconnected with cables and plug-in connectors, separate sets of cables and connectors are generally used for power and signal, and the order or sequence in which the power and signal connectors are to be inserted and removed is sometimes specified in order to prevent component damage and/or ensure technician safety. For example, some high-voltage components include a multi-bay connector header for receiving both a high-voltage power connector and a low-voltage signal connector, and an interlock mechanism for ensuring that the power connector is inserted prior to insertion of the signal connector, and that the signal connector is removed prior to removal of the power connector. In other words, the interlock mechanism ensures that the power connector makes-first and breaks-last, relative to the signal connector. By way of example, the U.S. Pat. Nos. 7,084,361 and 7,402,068 show and describe connection-sequencing interlock mechanisms for high-voltage vehicle electrical systems.

The main drawback with known connection-sequencing interlock mechanisms is that they tend to be application specific and require custom-produced connectors, which can significantly increase system cost. Accordingly, what is needed is a connection system with an improved connection-sequencing interlock mechanism that works with conventional or inexpensive connector devices.

SUMMARY OF THE INVENTION

The present invention is directed to a connection system including a multi-bay connector header and an improved connection-sequencing interlock plate integrated into the connector header. The interlock plate covers portions of the connector header, and can move with respect to the connector header to prevent access to selected bays of the connector header. A detent lock feature retains the interlock plate in a base position that allows insertion of one or more make-first/break-last connectors, but blocks insertion of one or more make-last/break-first connectors. Once the make-first/break-last connector(s) is inserted, the detent lock is released, and the interlock plate is then moved from the base position to a shifted position that prevents removal of the inserted connector(s), and allows insertion of the make-last/break-first connector(s). Insertion of the make-last/break-first connector(s) locks the interlock plate in the shifted position, so that the make-last/break-first connector(s) must be removed prior to the make-first/break-last connector(s). Once the make-last/break-first connector(s) have been removed, the interlock plate is returned to the base position to permit removal of the make-first/break-last connector(s).

DESCRIPTION OF THE PREFERRED EMBODIMENT

The apparatus of the present invention is disclosed herein in the context of a connection system 10 for a high voltage vehicle electrical system, including a multi-bay male-pin connector header 12 configured to receive multiple plug-in female connectors. In the illustrated embodiment, the connector header 12 is mounted on a circuit board 13, but it should be understood that the connector header 12 may alternatively be integrated into a larger component such as the housing of a battery pack, if desired. Moreover, the connection system 10 may be used in various other applications, both vehicular and non-vehicular.

Figure 1:
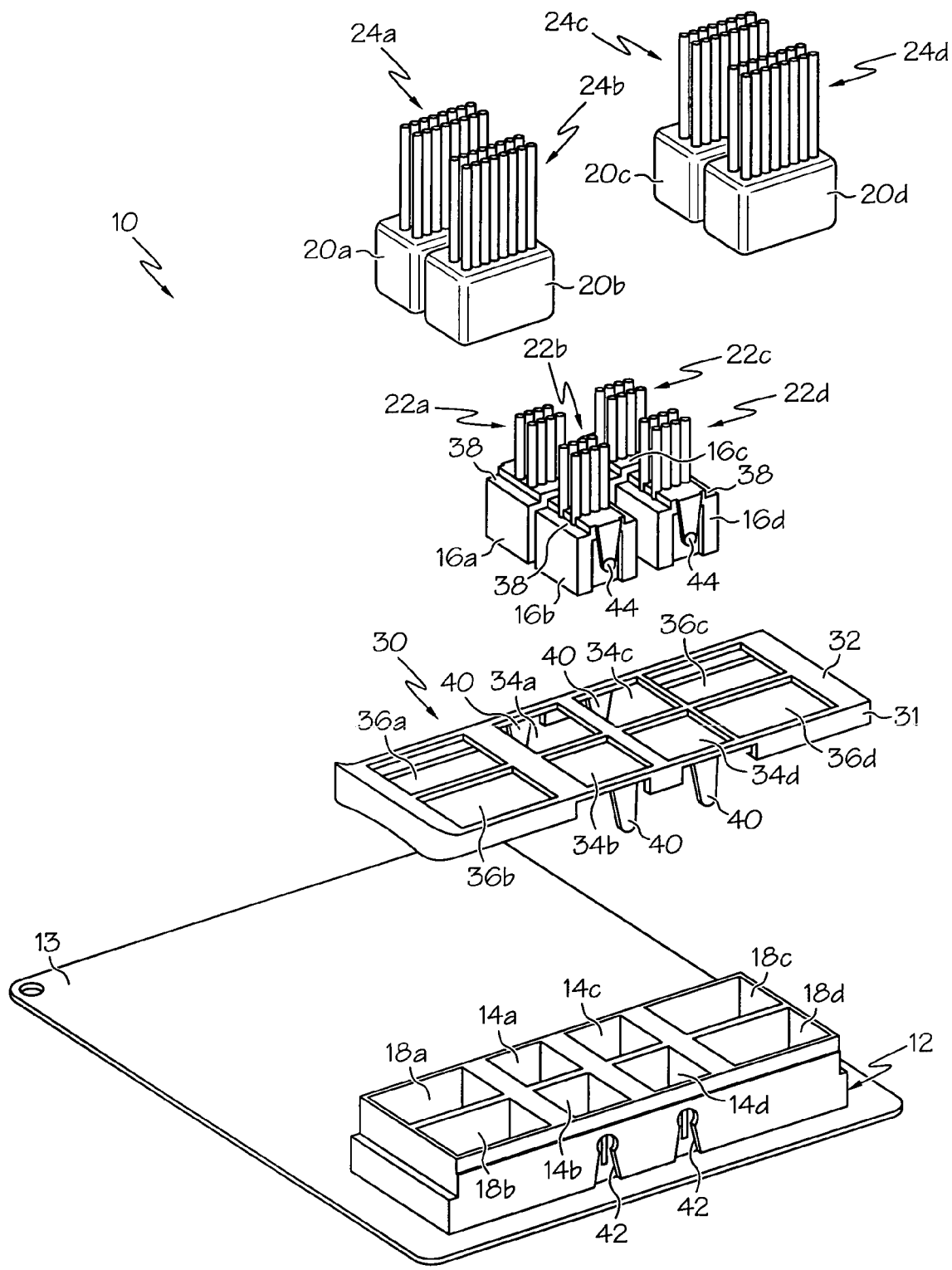
FIG. 1 is an exploded isometric view of the multi-connector apparatus of the present invention, including a multi-bay connector header and an interlock plate.

Referring to the exploded view of FIG. 1, the illustrated connector header 12 includes a set of four high-voltage bays 14a, 14b, 14c, 14d configured to receive four high-voltage female power connectors 16a, 16b, 16c, 16d, and a set of four low-voltage bays 18a, 18b, 18c, 18d configured to receive four female signal connectors 20a, 20b, 20c, 20d. The connector pins in each of the high-voltage bays 14a, 14b, 14c, 14d are connected to the terminals of a high voltage battery pack (not shown), so that the power connectors 16a, 16b, 16c, 16d can couple high-voltage power to various high-voltage components (not shown) of the electrical system via the associated cables 22a, 22b, 22c, 22d. And the connector pins in each of the low-voltage bays 18a, 18b, 18c, 18d are connected to temperature sensors or to voltage taps used to measure battery pack cell voltages, which are fed to a signal processor (not shown) by the signal connectors 20a, 20b, 20c, 20d and the associated cables 24a, 24b, 24c, 24d.

An interlock plate 30 slidably fastened to connector header 12 requires a servicing technician to remove the signal connectors 20a-20d from low-voltage header bays 18a-18d prior to removing the power connectors 16a-16d from high-voltage header bays 14a-14d; and after servicing, to insert the power connectors 16a-16d into high-voltage header bays 14a-14d prior to inserting the signal connectors 20a-20d into low-voltage header bays 18a-18d. The purpose of the signal-before-power removal sequence is to allow the signal processor to detect the impending power disconnect and prepare the system for safe removal of the power connectors 16a-16d. And the purpose of the power-before signal insertion sequence is to surge-protect the temperature sensors and the signal processor.

Figure 2A:
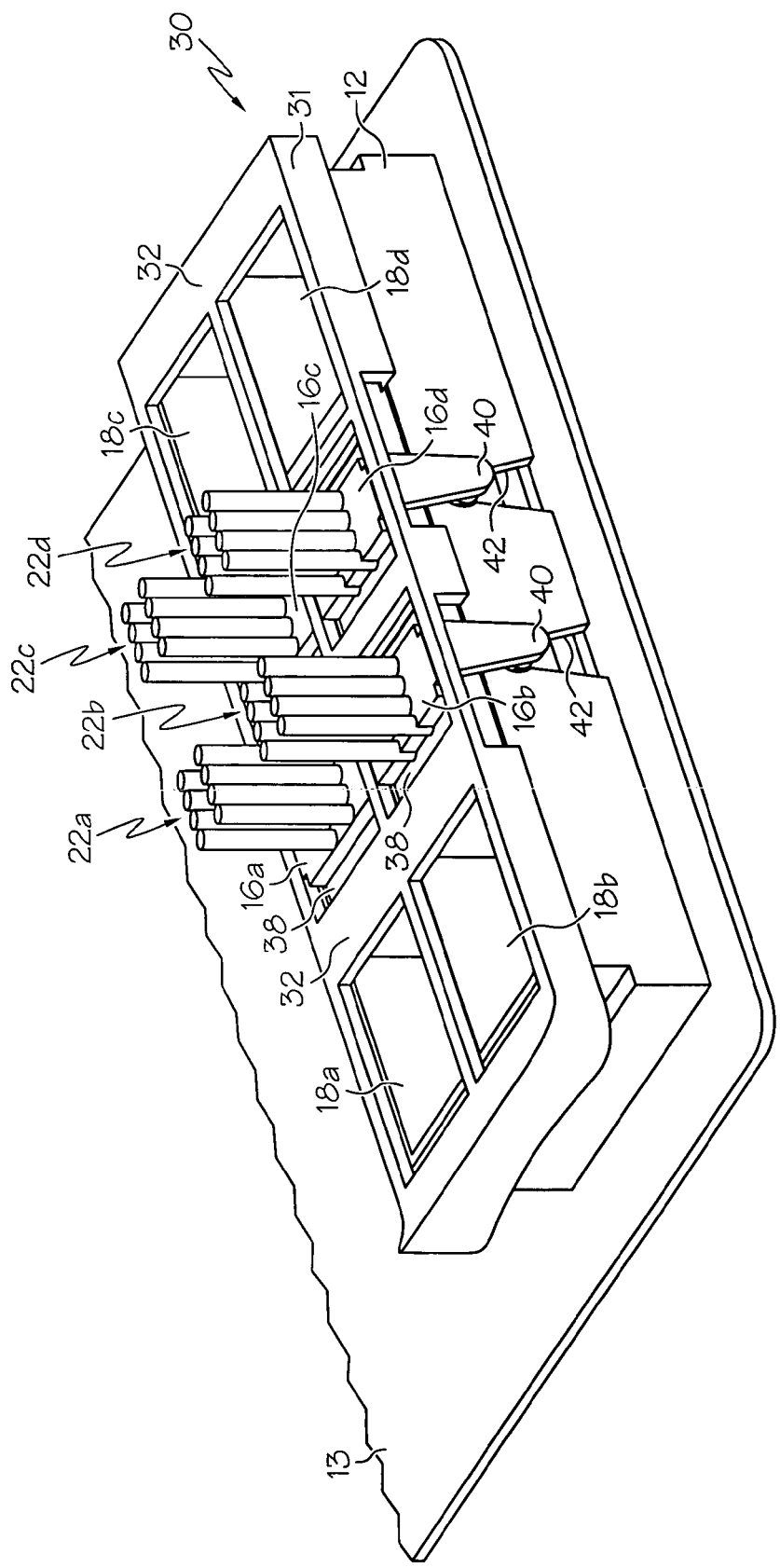
FIG. 2A is an isometric view of an assembled multi-connector apparatus, with the interlock plate in a base position.
Figure 2B:
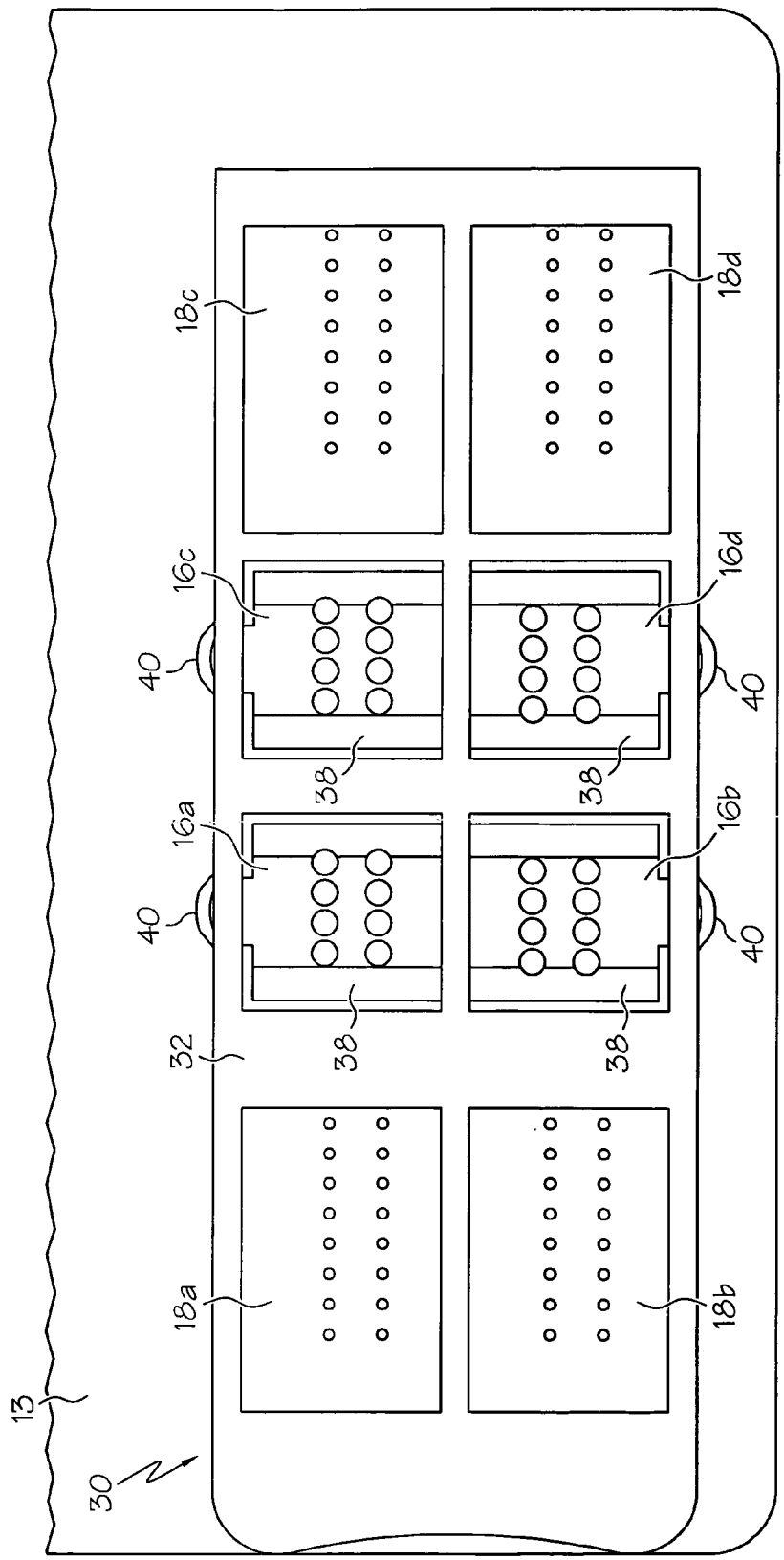
FIG. 2B is a plan view of the multi-connector apparatus of FIG. 2A in the direction of the connector header bays.
Figure 3A:
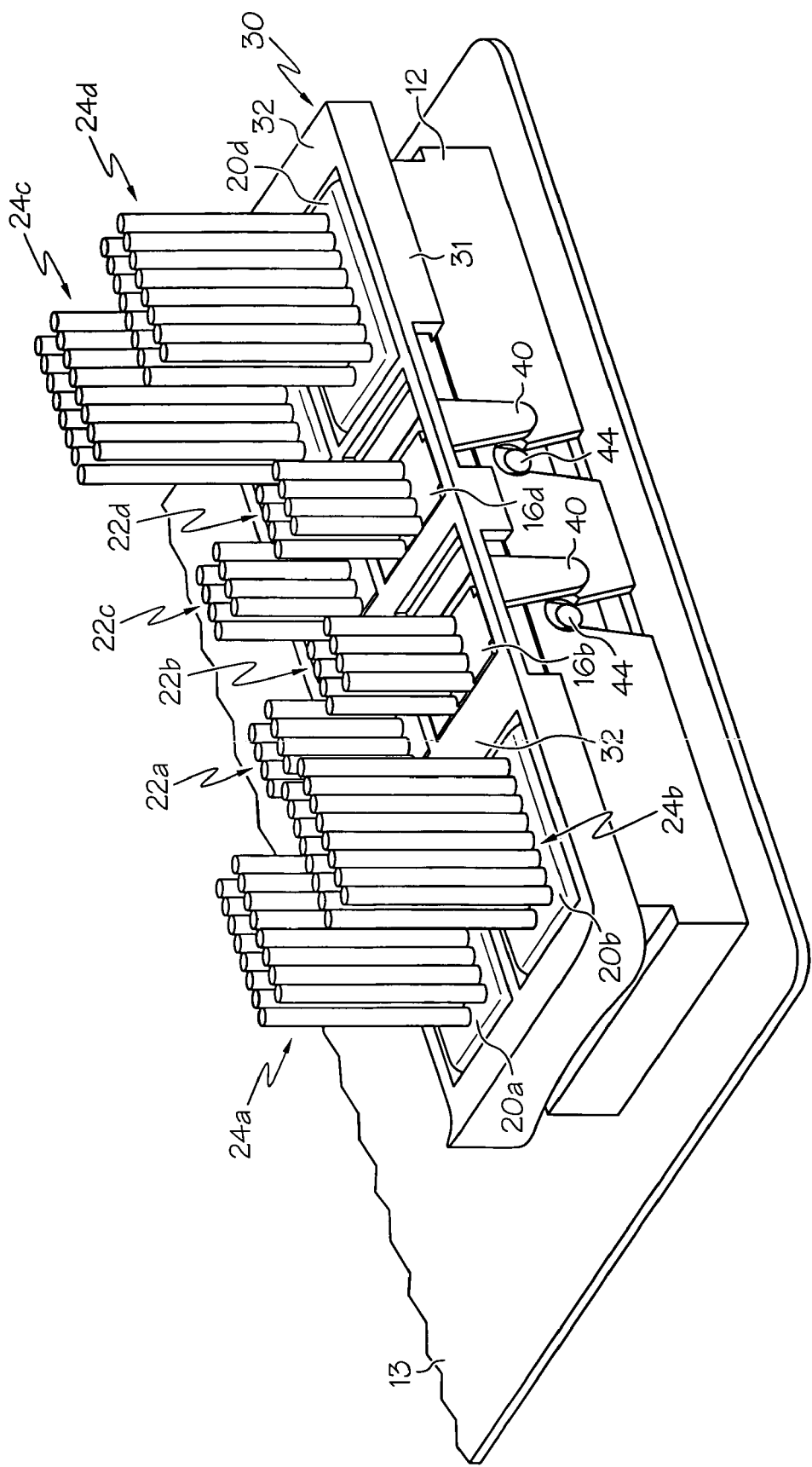
FIG. 3A is an isometric view of an assembled multi-connector apparatus, with the interlock plate in a shifted position.
Figure 3B:
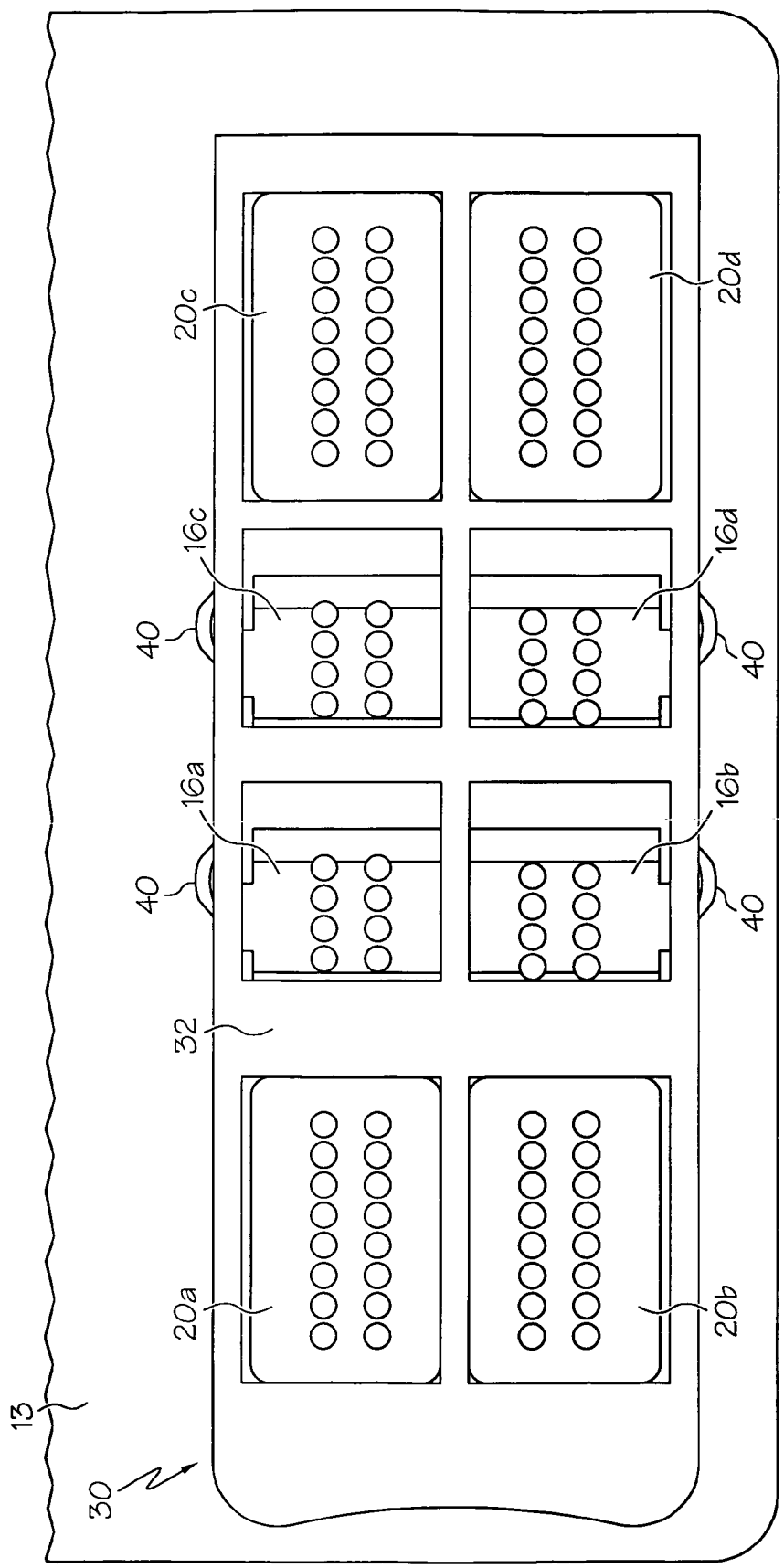
FIG. 3B is a plan view of the multi-connector apparatus of FIG. 3A in the direction of the connector header bays.

Interlock plate 32 comprises a peripheral frame 31 that surrounds the connector header 12 and a top surface 32 that selectively and partially overlaps the bays 14a-14d and 18a-18d of connector header 12. The top surface 32 is provided with a set of four central openings 34a, 34b, 34c, 34d configured to receive the four power connectors 16a-16d, and a set of four laterally outboard openings 36a, 36b, 36c, 36d configured to receive the four signal connectors 20a-20d. In a base position of the interlock plate 30, depicted in FIGS. 2A-2B, the four central openings 34a-34d align with the four high-voltage bays 14a-14d of connector header 12, but the four laterally outboard openings 36a-36d are laterally offset with respect to the four low-voltage bays 18a-18d of connector header 12. Thus, with interlock plate 30 in its base position, the four power connectors 16a-16d can be freely inserted into (or removed from) the four high-voltage bays 14a-14d, but the four signal connectors 20a-20d cannot be inserted into the low-voltage bays 18a-18b. And as best seen in FIGS. 1 and 2A, the sidewalls of power connectors 16a-16d are undercut laterally outboard of the cables 22a-22d as indicated by the reference numerals 38 so that once the power connectors 16a-16d are inserted into the four high-voltage bays 14a-14d, the interlock plate 30 can be slid laterally to the shifted position depicted in FIGS. 3A-3B. In the shifted position, the four laterally outboard openings 36a-36d align with the four low-voltage bays 18a-18d to permit insertion (and removal) of the signal connectors 20a-20d, and portions of the interlock plate top surface 32 adjacent the openings 34a-34b overlap the marginal portions of the inserted power connectors 16a-16d to prevent them from being removed. And when the four signal connectors 20a-20d are inserted into the low-voltage bays 18a-18d, interference between the installed signal connectors 20a-20d and the portions of the interlock plate top surface 32 adjacent the openings 36a-36d prevent the interlock plate 30 from being moved back to the base position.

Finally, the connection system 10 includes a detent lock feature for retaining the interlock plate 30 in the base position prior to insertion of the power connectors 16a-16d. The detent lock feature is formed by a set of tabs 40 on interlock plate 30 and a corresponding set of slots 42 formed in the sidewalls of connector header 12. A domed projection is formed on the inboard face of each tab 40, and the domed projections seat in the connector header slots 42 when the interlock plate 30 is in the base position depicted in FIGS. 2A-2B. Each of the power connectors 16a-16d include a similar projection 44 formed on the sidewall adjacent to the sidewall of the connector header 12, so that when a given power connector is inserted into a high-voltage bay of connector header 12, the outwardly depending projection 44 on the side of the power connector engages the inwardly depending projection on the respective tab 40 of interlock plate 30, pushing the tab projection out of the respective slot 42. When the power connectors 16a-16d have all been inserted into the high-voltage bays 14a-14d, the interlock plate tabs 40 are no longer seated in the connector header slots 42, leaving the interlock plate 30 free for lateral movement with respect to the connector header 12. Thus, the detent lock feature serves to both initially retain the interlock plate 30 in the base position, and to prevent lateral movement of the interlock plate 30 with respect to the connector header 12 until the power connectors 16a-16d have all been inserted into the high-voltage bays 14a-14d of connector header 12.

In summary, the multi-connector apparatus of the present invention provides a reliable way of ensuring a preordained connector make-and-break sequence any time the connectors 16a-16d and 20a-20d are inserted or removed, whether at initial factory installation or during subsequent maintenance or servicing. At factory installation, the detect lock feature holds the interlock plate 30 in the base position of FIGS. 2A-2B so that only the power connectors 16a-16d can be inserted into the connector header 12. And all of the power connectors 16a-16d have to properly inserted before the detent lock feature releases the interlock plate 30. Then the installer slides the interlock plate 30 to the shifted position of FIGS. 3A-3B so that the signal connectors 20a-20d can be inserted into the connector header 12. At that point, the interlock plate 30 cannot be moved due to interference between it and the installed signal connectors 20a-20d. At subsequent maintenance or servicing, the signal connectors 20a-20d must be removed first due to the shifted position of the interlock plate 30. Then the technician can shift the interlock plate 30 to the base position of FIGS. 2A-2B, and remove the power connectors 16a-16d. And after at least one of the power connectors 16a-16d have been removed, the detent lock feature re-engages to retain the interlock plate 30 in the base position. It will also be apparent that the multi-connector apparatus of the present invention provides a cost-effective way ensuring a preordained connector make-and-break sequence because the interlock plate 30 is obviously inexpensive to produce, and the connectors 16a-16d and 20a-20d are either conventional or only slightly modified.

While the multi-connector apparatus of the present invention has been described in reference to the illustrated embodiment, it should be understood that various modifications in addition to those mentioned above will occur to persons skilled in the art. For example, the connector header 12 may be configured to accommodate a greater or lesser number of connectors, the connector header 12 may be molded as part of a larger component or assembly, and so forth. Accordingly, it is intended that the invention not be limited to the disclosed embodiment, but that it have the full scope permitted by the language of the following claims.

The invention claimed is:

1. A multi-connector apparatus with connection-sequence interlocking, comprising:

at least one make-first/break-last connector;

at least one make-last/break-first connector;

a connector header having at least first and second connector bays configured to receive said make-first/break-last and make-last/break-first connectors, respectively;

an interlock plate movably affixed to said connector header for covering selected portions of said first and second connector bays to prevent or allow insertion and removal of said make-first/break-last and make-last/break-first connectors, said interlock plate having a base position that allows insertion of said make-first/break-last connector into said first connector bay while preventing insertion of said make-last/break-first connector into said second connector bay, and a shifted position that prevents removal of an inserted make-first/break-last connector from said first connector bay while allowing insertion of said make-last/break-first connector into said second connector bay; and a locking mechanism for holding said interlock plate in said base position prior to insertion of said make-first/break-last connector into said first connector bay, wherein said locking mechanism comprises a tab depending from a frame of said interlock plate, and a slot formed in a sidewall of said connector header in which said depending tab seats, wherein said make-first/break-last connector includes an outwardly depending projection that engages said depending tab when said make-first/break-last connector is inserted into said first connector bay to release said locking mechanism and allow movement of said interlock plate to said shifted position.

2. The multi-connector apparatus of claim 1, where:
the insertion of said make-last/break-first connector into said second connector bay blocks movement of said interlock plate, so that said make-last/break-first connector must be removed from said second connector bay before said interlock plate can be returned to said base position for removing said make-first/break-last connector from said first connector bay.

3. The multi-connector apparatus of claim 1, where:
said make-first/break-last connector has an undercut sidewall that is overlapped by said interlock plate when said interlock plate is in said shifted position.

4. The multi-connector apparatus of claim 1, where:
said interlock plate includes a frame portion that surrounds a periphery of said connector header and a top portion with openings for receiving said make-first/break-last connector and said make-last/break-first connector.

5. The multi-connector apparatus of claim 1, where:
said locking mechanism releases to allow movement of said interlock plate to said shifted position when said make-first/break-last connector is inserted into said first connector bay.

* * * * *